Patented Mar. 31, 1942

2,277,805

UNITED STATES PATENT OFFICE 2,277,805

WETTING AND DETERGENT AGENT

Mark Weisberg, Providence, Louis Corman, Rumford, and Preston G. Slachman, Providence, R. I., assignors to Alrose Chemical Company, Cranston, R. I., a corporation of Rhode Island No Drawing. Application November 1, 1939, Serial No. 302,434

7 Claims. (Cl. 260—401)

This invention relates to the preparation of new and useful wetting and detergent agents having surface active properties. More particularly it relates to the products formed by reacting in the presence of sulfuric acid, phenols with the acid amides prepared from higher fatty acids and alkylol amines. Such compounds are useful as wetting, detergent, dispersing and emulsifying agents, as dye bath aids and in general as textile assistants.

It is known in the prior art that surface active agents may be prepared from the condensation products of alkylol amines with fatty acids, by treating such condensation products with sulfuric acid. For example capric acid may be condensed with monoethanolamine and this resulting condensation product may be treated with sulfuric acid. Also by U. S. Patent No. 2,098,551, a wax, as beeswax, is aminolyzed with ethanolamine to yield a mixture of carboxylic acid amides and the higher molecular alcohols; this mixture is sulfonated and by one conception such may be carried out in the presence of aromatic hydrocarbons or phenols.

As indicated supra, an object of this invention is to prepare new chemical products with good wetting, cleaning and detergent properties by reacting the amide from an alkylol amine higher fatty acid with phenols in the presence of sulfuric acid and under the condition of relative freedom from reactants as the higher alcohols whereby condensation of the acid amide with the phenol and sulfonation results in one operation.

It is an object, by employing as a starting material this acid amide relatively free from other bodies as the alcohols which are reactive, to prepare a final product free of such by-products.

It is an additional object of this invention to employ phenols in such amounts as will react with the proportion of the initial condensation product. Other and important objects of this invention will become apparent from the following description and appended claims.

It is an economic advantage to employ phenols in conjunction with the higher fatty acid amide inasmuch as most phenols compare favorably in price with said higher fatty acid amides.

The higher fatty acid amides which are useful for the purpose of this invention may be prepared from the higher fatty acids as capric, lauric, myristic or palmitic acid and either the alkylol primary amines such as monoethanolamine or alkylol secondary amines as monoethanolamine, by heating together the desired acid and the alkylol amine at an elevated temperature until the condensation is practically complete; this is shown by the substantial absence of acid in the condensation product.

Among the phenols useful for the purposes of this invention there are: carbolic acid, cresols, resorcinol, quinol, catechol, pyrogallol, butyl phenols, amyl phenols as well as higher phenols. The commercially available ortho amyl phenol is especially useful. This phenol consists principally of tertiary amyl derivatives but contains, also, small proportions of secondary amyl derivatives and small proportions of para amyl phenols.

The sulfuric acid useful for the purposes of this invention may be any one of the commercially available grades, such as the 93% and the monohydrate, as well as oleum, such as 20% oleum. The time and temperature of the sulfuric acid treatment are variable and are dependent too upon the concentration of the acid employed.

While we do not know exactly the nature of the reaction, it is thought that the final product has sulfate or sulfonic linkages or both, and that the amide structure alkyl group is attached to the phenol nucleus as a result of splitting off water. However applicants are not bound by the theory and are in no sense restricted thereto in their claims.

The following serve to illustrate our invention.

Example #1

Heat together, with stirring, lauric acid and monoethanolamine in molecular proportions at temperatures up to 180° C. until tests of the product as indicated by its acid member reveal the substantial absence of lauric acid. The resulting product is a light brown wax.

11 grams of this wax are dissolved in 8.2 grams of commercial ortho amyl phenol at 45° C. to 50° C. after which 20 grams of sulfuric acid monohydrate are added dropwise, maintaining the temperature of the reaction mixture between 45 and 55° C. The resulting mixture is then held at 75° C. for one hour and then neutralized with 45% commercial potassium hydroxide liquor at temperatures between 20° C. and 30° C.

The resulting material is a buff-colored paste capable of forming dilute aqueous solutions possessed of good foaming and wetting properties.

Example #2

11 grams of the wax prepared as described in Example #1 are dissolved in 8.2 grams of ortho amyl phenol at 45 to 55° C. This solution is then added, dropwise and with stirring, to 20 grams of sulfuric acid monohydrate while the temperature of the reacting materials is held between 30° C. and 40° C. Stirring is then continued for an additional 15 minutes while the temperature is maintained in the same range. Neutralization is effected as described in Example #1.

A buff-colored paste yielding clear, dilute foaming aqueous solutions is obtained.

Example #3

11 grams of the wax prepared as described in Example #1 are dissolved in 5 grams of commercial cresol at about 40° C. This solution is added, dropwise and with stirring, to 20 grams of sulfuric acid monohydrate while the temperature of the reacting materials is held between 30° C. and 40° C.

The temperature of the reaction mixture is then brought to 50° C. and maintained, with stirring at 50° C. for an additional 45 minutes.

The resulting product is neutralized at 20 to 30° C. with 45% potassium hydroxide liquor. A light tan paste, capable of forming foamy dilute aqueous solutions, results.

Example #4

11 grams of the wax prepared as described in Example #1 are mixed with 4.7 grams of carbolic acid, and the mixture is brought to a temperature of about 45° C.

With stirring, 20 grams of sulfuric acid monohydrate are added dropwise to this mixture while the temperature of the reactants is held at about 50° C.

The temperature is then raised to 70° C. and held at this point, with stirring for an additional hour.

The resulting material is neutralized at 20 to 30° C. with 50% caustic soda liquor. A cream-colored stiff paste, capable of forming foamy dilute aqueous solutions, results.

It will be understood that many variations and modifications are possible in our invention without departing from the scope and spirit of it. Therefore it is to be understood that the invention is not limited to the specific embodiments except as defined in the appended claims.

We claim:

1. In the process of preparing a sulfonated alkyl-aryl condensation product, the step of reacting with a concentrated sulfuric acid a mixture of a phenol and an acid amide prepared by reacting fatty acids having 8 to 20 carbon atoms with an ethanolamine thereby effecting both condensation and sulfonation in one operation, wherein said acid amide is relatively free of higher alcohols.

2. The process set forth in claim 1 followed by neutralization.

3. The process set forth in claim 1 wherein the fatty acids are from cocoanut oil.

4. The process set forth in claim 1 wherein the phenol is amyl phenol.

5. The process set out in claim 1 wherein the phenol is a higher alkyl phenol.

6. The process set out in claim 1 wherein the phenol is a polyhydroxyphenol.

7. In the process of preparing a sulfonated alkyl-aryl condensation product, the step of reacting with a concentrated sulfuric acid a mixture of a phenol and an acid amide prepared by reacting fatty acids having 8 to 20 carbon atoms with monoethanol amine thereby effecting both condensation and sulfonation in one operation, wherein said acid amide is relatively free of higher alcohols.

MARK WEISBERG.
LOUIS CORMAN.
PRESTON G. SLACHMAN.